(12) United States Patent
Hess et al.

(10) Patent No.: US 6,951,330 B2
(45) Date of Patent: Oct. 4, 2005

(54) VALVE WITH DAMPING ELEMENT

(75) Inventors: Juergen Hess, Baden-Baden (DE);
Georg Reeb, Buehl Eisental (DE);
Bernd Hein,
Baiersbronn/Schoenmuenzach (DE)

(73) Assignee: Robert Bosch GmbH, Stuttgart (DE)

( * ) Notice: Subject to any disclaimer, the term of this patent is extended or adjusted under 35 U.S.C. 154(b) by 35 days.

(21) Appl. No.: 10/467,132

(22) PCT Filed: Dec. 10, 2002

(86) PCT No.: PCT/DE02/04502

§ 371 (c)(1),
(2), (4) Date: Aug. 1, 2003

(87) PCT Pub. No.: WO03/054428

PCT Pub. Date: Jul. 3, 2003

(65) Prior Publication Data

US 2004/0155212 A1 Aug. 12, 2004

(30) Foreign Application Priority Data

Dec. 11, 2001 (DE) .................. 101 60 970

(51) Int. Cl.⁷ .............................. F16K 31/06
(52) U.S. Cl. ........................ 251/64; 251/86
(58) Field of Search ................... 251/64, 84–86

(56) References Cited

U.S. PATENT DOCUMENTS 4,364,541 A   12/1982  Chabat-Courrede et al.
4,647,011 A * 3/1987  Contzen et al. ........ 251/129.15
5,579,741 A   12/1996 Cook et al.
5,937,884 A   8/1999  Barnoin
5,944,053 A * 8/1999  Kabierschke et al. .. 137/625.29

FOREIGN PATENT DOCUMENTS

DE  197 54 257 A1   6/1999
DE  100 17 030 A   10/2001
EP  0 482 398 B1    4/1996

* cited by examiner

Primary Examiner—J. Casimer Jacyna
(74) Attorney, Agent, or Firm—Michael J. Striker

(57) ABSTRACT

The invention relates to a valve, in particular for a fluid-regulated heating and/or cooling system of a motor vehicle, having a valve chamber (18, 218), with at least one inlet conduit (14, 214) and at least one outlet conduit (16, 216) branching off from it, and having a displacement rod (26, 226) movable by an actuator, and having at least one valve member (20, 220), which is located on the displacement rod (26, 226) and cooperates with at least one valve seat (24, 224) of the valve chamber (18, 218), and at least one damping element (20, 220) is provided, which slows down the speed of the displacement rod (26, 226) upon closure of the valve (10, 12).

According to the invention, it is provided that the at least one damping element (20, 220) simultaneously acts as a valve member (20, 220).

10 Claims, 3 Drawing Sheets

VALVE WITH DAMPING ELEMENT

BACKGROUND OF THE INVENTION

The invention is based on a valve for a fluid-regulated heating and/or cooling system of a motor vehicle.

Such valves are known, for instance from fluid-regulated heating and/or cooling systems of motor vehicles. A valve member secured to a displacement rod of the valve regulates the flow between an inlet conduit and at least one outlet conduit. The valve can be triggered for instance as a function of temperatures in the heating and/or cooling system of the motor vehicle, or in the passenger compartment. Valves of this type at present primarily still have an electromagnetic actuator, which closes the valve by means of an excited magnet coil, causing the actuator to act on an armature connected to the displacement rod of the valve. A disadvantage of this type of valve is that the actuation of the actuator causes an abrupt closure and thus leads to pressure disturbances in the fluid system of the cooling system.

The water valves known at present for the heating and/or cooling system of motor vehicles are moreover sometimes very loud when they perform the switching function described. The noise develops among other reasons because of inadequate damping of the mechanical operating motion of the displacement rod.

From German Patent Disclosure DE 197 54 257 A1, a magnet valve for a fluid-regulated heating and/or cooling system is known which has an inlet conduit and at least one outlet conduit, whose mutual communication is established in a first switching position and blocked in a second switching position by an electromagnetically switched valve member. The valve of DE 197 54 257 A1, on its valve shaft, has an elastic element in the form of a spring, which slow down the speed of the valve shaft upon closure of the valve member. To that end, the spring element is disposed between the valve member and the valve shaft.

In a second version of the water valve of DE 197 54 257 A1, a damping disk is also solidly disposed on the valve shaft and moves within a damping chamber that is filled with a viscous fluid. To adapt the damping action for the valve member, a plurality of throttle bores are provided in the damping disk, which determine the resistance of the damping disk to the viscous fluid and thus slow down the motion of the displacement rod in the desired way.

From U.S. Pat. No. 4,364,541, a safety valve is know that has a two-piece displacement rod. While the first part of the displacement rod is connected to an actuator for the valve, the second part of the valve has two valve members spaced apart from one another. The two parts of the displacement rod of U.S. Pat. No. 4,364,541 are displaceable counter to one another in the axial direction of the displacement rod. The relative movability of the two parts of the displacement rod is mediated via an elastic spring element.

A disadvantage of the safety valve described in U.S. Pat. No. 4,364,541 is that complicated mutual decoupling of the two parts of the displacement rod. In addition, the relative movability of the two parts of the displacement rod in this prior art must be adjusted by an additional spring element. A valve of this kind, like the valve of DE 197 54 257 A1, requires complicated assembly, not least because there are so many individual parts. Furthermore, the complex design of the moving parts of the valve makes increased demands on the actuator, which in turn means increased weight and a large installed volume of the valve unit.

SUMMARY OF THE INVENTION

The valve according to the invention, having the characteristics of the main claim, has the advantage over the prior art that simple, fast assembly in the production of valves of this generic type is possible. Furthermore, the weight of the valve can be reduced markedly. The damping element advantageously also takes on the sealing function at the valve seat of the valve. In this way, many components are eliminated in the assembly of the valve, further reducing its complexity and likelihood of failure.

Because the valve member is at the same time designed as an elastic damping element, additional elastic components, such as spring elements, can be omitted.

Advantageously, the valve member is mounted movably on the displacement rod of the valve. The damping element, for instance in the form of a rubber seal, can be displaced axially in certain regions on the displacement rod. Because of this displaceability of the damping element, combined with a limiter for its displacement travel, damping in the operating direction of the displacement rod of the valve upon closure is achieved. Both the elastic properties of the material comprising the valve member, which advantageously simultaneously acts as a damping element, and the relative movability of the displacement rod with respect to the valve member lead to a slowing down of the speed of the displacement rod upon closure of the valve. This is associated with a reduction in noise development and in the mechanical stress upon activation of the valve of the invention.

The limiter for the displacement travel of the damping element can be achieved in a simple, advantageous way as a mechanical stop for the valve member. For that purpose, a damper ring or stop plate can be connected, for instance integrally, with the displacement rod.

Advantageously, on its side toward the damping element, this mechanical stop has a surface contour which is designed such that upon closure of the valve, this surface contour can plunge successively into the elastic damping element. In this way, a damping characteristic curve for the valve that leads to progressive damping of the displacement rod of the valve in the closing operation can be achieved.

In an advantageous embodiment, the surface contour of the motion limiter for the damping element has a spokelike basic structure originating at the central displacement rod. In this way, as the contour plunges into the elastic damping element, there is a constant increase in the contact area of the damping element on the mechanical stop of the damper ring, leading to progressive braking of the displacement rod.

In a further advantageous embodiment of the valve of the invention, the surface contour of the mechanical stop tapers to a point in the direction of the damping element. Because of the modification of the surface contour and/or by an adaptation of the elasticity of the damping element, the damping behavior and thus the noise development in valve operation can be favorably affected and adapted to requirements.

Advantageously, besides having a special surface contour, the mechanical stop can be embodied integrally with the displacement rod. Alternatively, however, limiters for the stroke of the elastic damping element that can be mounted and thus replaced are also possible. By changing the mechanical stops, the damping characteristic of the valve of the invention can then be varied easily for specific applications.

In an advantageous feature of the valve of the invention, the valve member acting as a damping element can be pressed onto the displacement rod in a simple way.

The use of the valve of the invention, for instance in the embodiment of an electromagnetic timing valve for the cooling and/or heating system of a motor vehicle, is possible with advantages, compared to the corresponding valves in the prior art.

The valve of the invention in a simple way enables a marked reduction in noise development upon switching of the valve with a simultaneous reduction in the structural parts and components required for the damping. The valve of the invention furthermore assures faster installation, and thus reduced costs in the production of the generic valves.

BRIEF DESCRIPTION OF THE DRAWINGS

In the drawing, one exemplary embodiment of a valve of the invention is shown, which is to be explained in further detail in the ensuing description. The drawing figures, their description, and the claims include numerous characteristics in combination. One skilled in the art will also consider these characteristics individually and put them together to make further useful combinations.

Shown are.

DETAILED DESCRIPTION OF THE PREFERRED EMBODIMENTS

Figure 1:
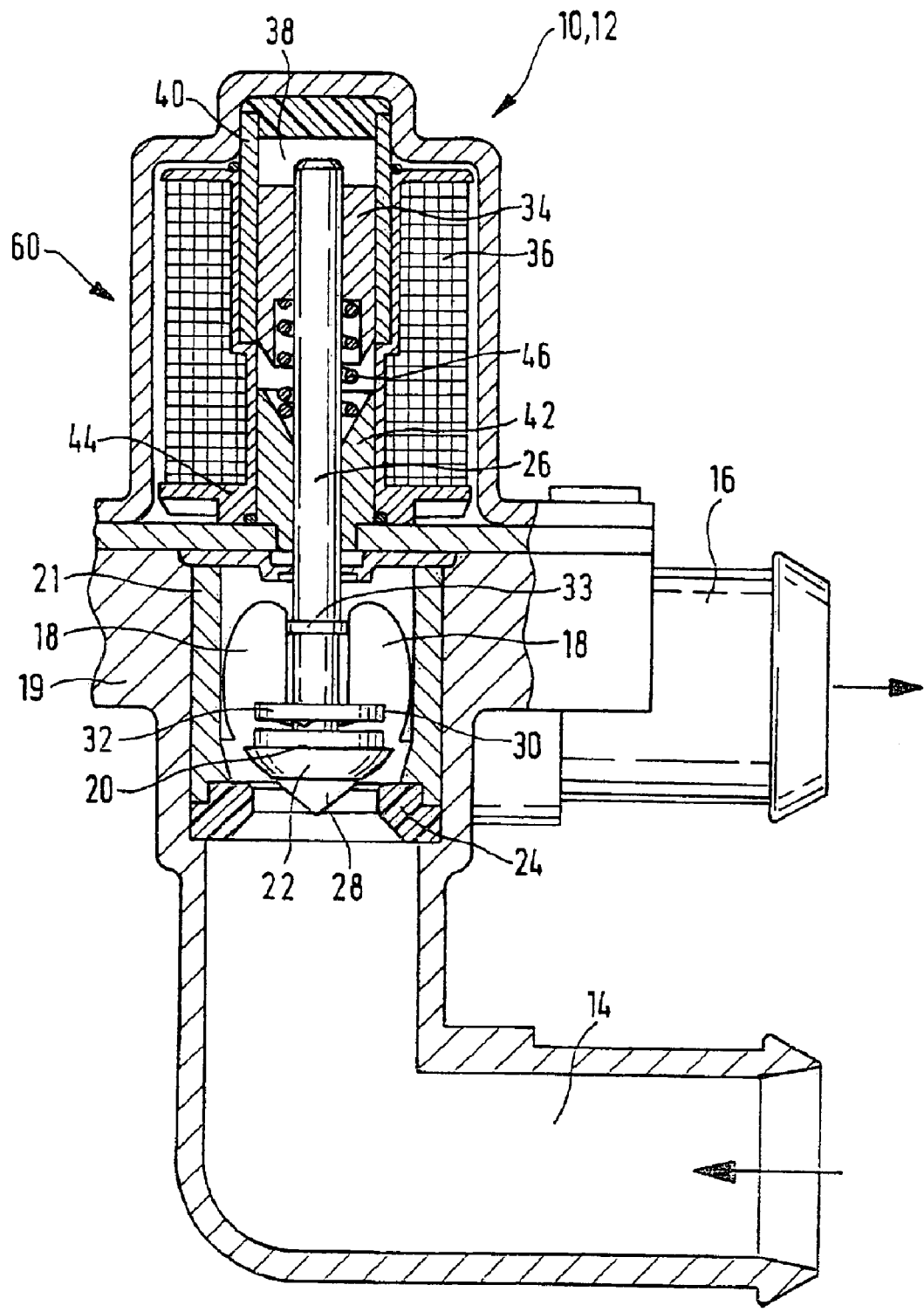
FIG. 1, a cross section through a valve of the invention in the embodiment as an electromagnetic timing valve.

The valve 10 of the invention, in the embodiment of a magnet valve 12 of FIG. 1, has an inlet conduit 14 and an outlet conduit 16, which communicate with one another via a valve chamber 18. The valve chamber 18 is formed by a valve chamber unit 21 inserted into the valve housing 19. Between the conduits 14 and 16, a valve member 20 is provided, which is disposed movably in the valve chamber 18 and which cooperates, via an elastic valve cone 22, with a valve seat 24 of the valve chamber 18. The valve seat 24, in the exemplary embodiment of FIG. 1, is embodied as an elastic ring that defines the valve chamber 18 relative to the inlet conduit 14.

Because of the elastic valve seat 24, the valve cone 22 of the valve member 20 need not necessarily also be elastic, in this exemplary embodiment.

The valve member 20 is axially displaceably supported on a displacement rod 26, and on the end of the displacement rod 26 toward the valve seat 24, it is secured on the displacement rod 26 by a securing plate 28. On the side of the valve member 20 remote from the valve seat 24, there is a damper ring 30, in the form of a mechanical stop plate 32, which is solidly connected to the displacement rod 26 and which, as a limiter, restricts the axial movability of the valve member 20 along the displacement rod 26.

Also secured to the displacement rod 26 are a stripper ring 33 and an actuator 34 that cooperates with a magnet coil 36 and forms the electromagnetic actuator 60 for the valve of the invention, in the embodiment of FIG. 1. The armature 34 is axially displaceably guided in an armature chamber 38 of the actuator 60 by a guide bush 40.

The fluid pressure, which prevails for instance in a heating and/or cooling system to be regulated in a motor vehicle, and which is established in the inlet conduit 14 of the valve of the invention, displaces the valve member 20 into its open position, so that the valve cone 22 is lifted from the valve seat 24. If the magnet coil 36 is excited, an armature core 42, which is connected to a short-circuit yoke 44 of the actuator 60, attracts the armature 34, counter to the force of a valve spring 46 disposed in the armature chamber 38 and counter to the fluid pressure in the inlet conduit 14, and the valve member 20 closes the communication between the inlet conduit 14 and the outlet conduit 16 of the valve 12 by pressure the valve cone 22 against the valve seat 24.

Figure 2:
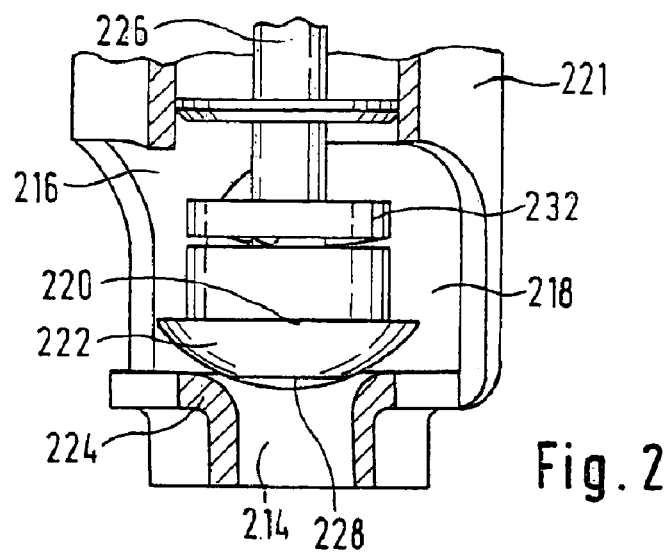
FIG. 2, a section through the valve chamber of a valve of the invention in the open valve position.
Figure 3:
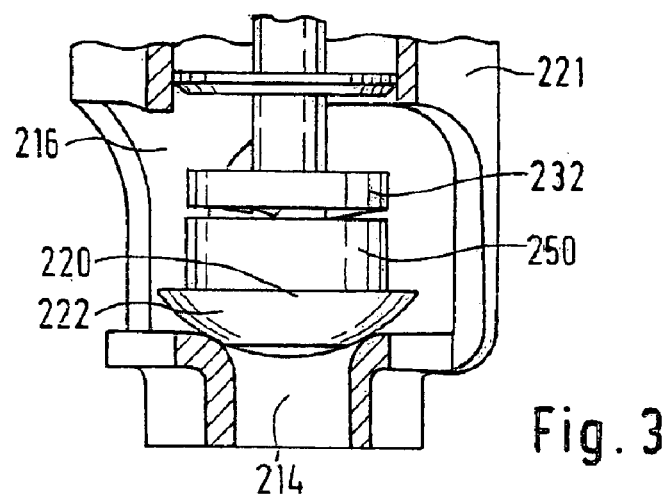
FIG. 3, a section through the valve chamber of a valve of the invention of FIG. 2, as closure of the valve begins.
Figure 4:
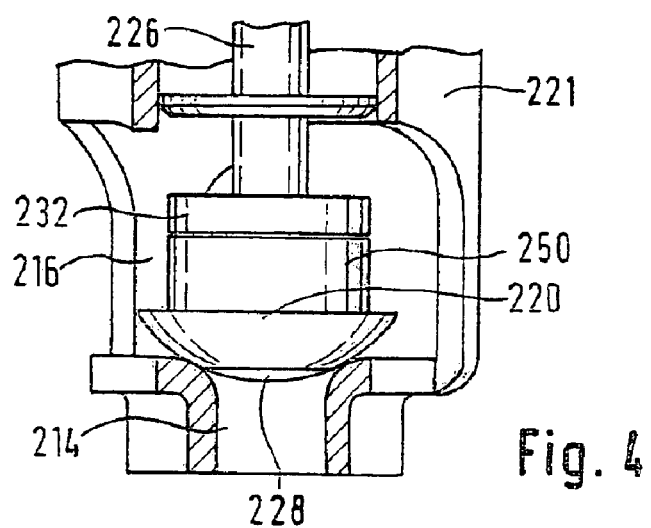
FIG. 4, a section through the valve chamber of a valve of the invention of FIGS. 2 and 3, with the valve closed.

In FIGS. 2, 3 and 4, this closing operation is shown once again in its essential phases, in order to illustrate the valve of the invention clearly. FIG. 2 is a detail of a valve 10 of the invention in the region of its valve chamber 218. An inlet conduit 214 and an outlet conduit 216 lead into the valve chamber 218, which in this exemplary embodiment is formed by a one-piece valve chamber unit 221. The communication between the inlet conduit 214 and the outlet conduit 216 is mediated by a valve member 220, which cooperates with a valve seat 242 of the valve chamber 218. In the exemplary embodiment of FIG. 2, the valve seat 242 is embodied integrally with the valve housing 248. It is understood that other versions of the valve seat of a valve 10 of the invention are equally possible.

The valve member 220 is actuated via a displacement rod 226 by an actuator, not identified by reference numeral, which need not necessarily be a magnetic activator. Also located on the displacement rod 226, in the region of the valve member 220, is a securing plate 228, which on one side limits the axial movability of the valve member 220 on the displacement rod 226.

Figure 5:
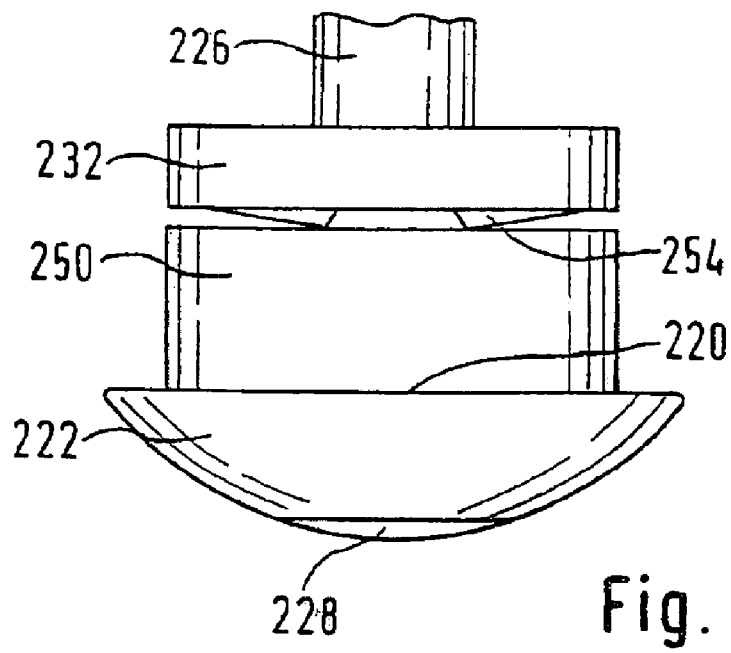
FIG. 5, the valve member of a valve of the invention in a detail view.

In FIG. 5, the end of the displacement rod 226 toward the valve seat 224 is shown once again in detail. The valve member 220 comprises an elastic valve cone 222, which cooperates with the valve seat 224. On the side of the valve cone 222 remote from the valve seat 224, the valve member 220, in the exemplary embodiment of FIGS. 2 and 5, comprises an elastic valve ring 250, which in this exemplary embodiment is solidly connected to the valve cone 222.

In other embodiments of the valve 10 of the invention, the elastic valve ring 250 can be embodied integrally with the valve cone 222 and can for instance comprise the same elastic sealing rubber material as the valve cone 222.

On the side of the displacement rod 226 toward the valve seat 224, the valve member 220 is locked on the displacement rod by means of the securing plate 228. to that end, the valve member 220 can be everted over the stop plate 228, which in the exemplary embodiment has a larger diameter than the displacement rod 226. The stop plate 228 can be embodied integrally with the displacement rod 226, or it can be fixed on the displacement rod by means of currently used joining methods.

On the side of the valve member 220 remote from the valve seat 224, a stop plate 232 acting as a limiter is fixed on the displacement rod 226 in such a way that a relative motion of the valve member 220 between the securing plate 228 and this stop plate 232 is possible. The stop plate 232 can be either embodied integrally with the displacement rod or joined solidly to the displacement rod in other ways quite familiar to one skilled in the art. On its underside 252 oriented toward the valve member 220, as can be seen particularly from FIG. 6, the stop plate 232 has a spokelike surface structure 254, which protrudes from the surface 256 of the underside 252 of the stop plate.

Figure 6:
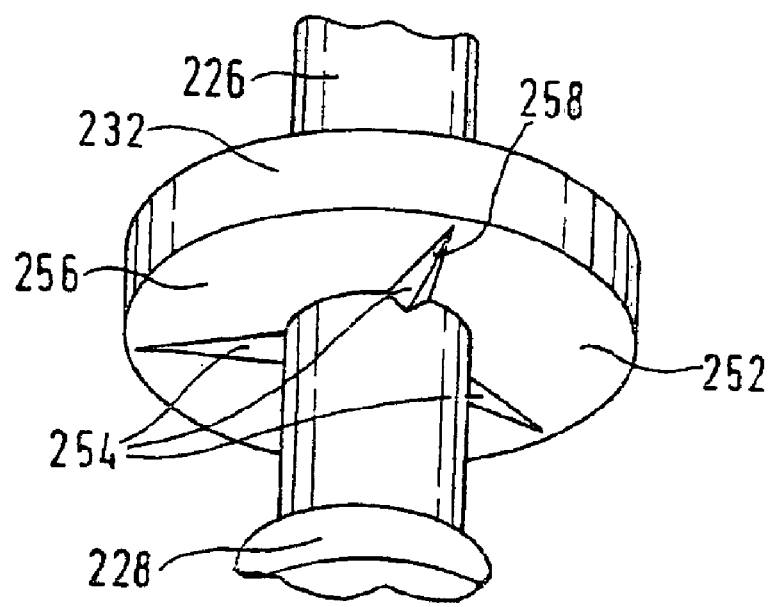
FIG. 6, the displacement rod of a valve of the invention, in perspective, in the region of the valve member.

A detail of the stop plate 232 is shown in perspective in FIG. 6, with the valve member removed for the sake of simplicity and clarity. In this exemplary embodiment, the stop plate 232 mounted on the displacement rod 226 has three spokelike protuberances 258, pointing radially outward from the displacement rod 226, which taper to a point in the direction of the valve member 220, for instance in the direction toward the securing plate 228, and which decrease in their height radially outward over the surface 256 of the underside 252 of the stop plate 232, beginning at the displacement rod 226.

Surface contours 254 of the underside 252 of the stop plate 232 that are different from that shown in FIG. 6 are understood to be equally possible.

In the case of the open valve, as shown for instance in FIG. 2, the valve member 220 is spaced apart from the underside 252 of the stop plate 232 on the displacement rod. If the valve is closed by actuation of its actuator, then by the mediation of the displacement rod 226, first the valve cone 222 takes a seat on the valve seat 242, as is also shown in FIG. 3. The further closing motion of the displacement rod 226 then leads to a relative motion of the displacement rod 226, with the stop plate 232 secured to it, relative to the valve member 220. In the process, the surface contour 254 on the underside 252 of the stop plate 232 plunges into the elastic material of the valve member 220. This brakes the downward motion of the displacement rod 226 and markedly reduces any possible noise development upon closure of the valve.

The surface contour 254 on the underside 252 of the stop plate 232, in the exemplary embodiment shown in FIG. 6, is characterized by a constant increase in the cross section counter to the operating direction of the displacement rod 226. As the surface contour 254 of the stop plate 232 plunges into the elastic material of the valve ring 250, the result is therefore a progressive damping characteristic curve.

The damping behavior of the valve of the invention and thus also its noise development in valve operation can be affected positively by the modification of the surface structure 254 of the stop plate 232 and by a variation in the hardness of the valve ring 250. This can advantageously also be accomplished without changing the material properties of the actual valve cone 222. To that end, the valve ring 250 can for instance have a different material from the valve cone 222. It is also possible to separate the valve ring 250 from the valve cone 222 and to embody the valve member 220 in multiple parts, so that an additional relative motion becomes possible between these two elements of the valve member 220.

At the end of an operating stroke, mediated by the actuator, for closing the valve of the invention, the underside 252 of the stop plate 232 rests virtually flat on the surface of the valve ring 250, as FIG. 4 shows.

The valve of the invention is not limited to the embodiments shown in FIGS. 1–6.

In particular, the valve of the invention is not limited to an embodiment as an electromagnetically activated timing valve. Hydraulic or pneumatic actuators are for instance equally possible, along with further embodiments for the valve of the invention.

Nor is the valve of the invention limited to the presence of only a single valve member with an associated stop plate; it can advantageously also be used for valves with two outlet conduits, for instance, with correspondingly two associated valve seats. In that case, an embodiment of the valve of the invention with two valve members and the associated stop plates may be provided.

The valve of the invention is not limited to the fluid direction of the fluid to be regulated that is shown in the exemplary embodiment of FIG. 1.

The valve of the invention is in particular not limited to the form of the surface contour of the stop plate for the valve member as shown in the exemplary embodiments. In particular, this surface contour is not limited in its shape to the embodiment shown in FIG. 6. Other surface structures, tapering to a point or to a blunt tip toward the valve member, depending on the damping behavior desired, can also be realized for the valve of the invention. The number and shape of the protuberances, which are shown as spokelike in FIG. 6, on the underside of the stop plate are not limited to any numerical boundary or other restriction in shape, either. It is understood that damping contours other than spokelike ones are equally possible.

The valve of the invention is furthermore not limited to use in fluid-regulated heating and/or cooling systems for motor vehicles.

What is claimed is:

1. A valve for a fluid-regulated heating and/or cooling system of a motor vehicle, having a valve chamber (18, 218), with at least one inlet conduit (14, 214) and at least one outlet conduit (16, 216) branching off from it, and having a displacement rod (26, 226) movable by an actuator, and having at least one valve member (20, 220), which is located on the displacement rod (26, 226) and cooperates with at least one valve seat (24, 224) of the valve chamber (18, 218), and at least one damping element (20, 220) is provided, which slows down the speed of the displacement rod (26, 226) upon closure of the valve (10, 12), characterized in that the at least one damping element (20, 220) simultaneously acts as a valve member (20, 220), wherein the at least one damping element (26, 226) is movable relative to the displacement rod (26, 226), wherein the displacement rod (26, 226) has means (28, 30, 32, 228, 232) which limit the movability of the damping element (26, 226) relative to the displacement rod (26, 226), wherein the means (28, 30, 32, 228, 232) are embodied in the form of a mechanical stop, wherein at least one mechanical stop (30, 32, 232), on its side (252) oriented toward the damping element (20, 220), has a surface contour (254), oriented counter to the damping element (20, 220), that upon closure of the valve (10, 12) plunges successively into the damping element (20, 220).

2. The valve of claim 1, wherein the at least one damping elemem (20, 220) is an at least partly elastic body that is disposed on the displacement rod (20, 228).

3. The valve of claim 1, wherein the surface contour (254) of the at least one mechanical stop (30, 32, 232) of the damping element (20, 220) is embodied such that the result is a progressive damping characteristic curve for the displacement rod (26, 226) of the valve (10, 12).

4. The valve of claim 1, wherein the surface contour (252) of the mechanical stop (32, 232) has a spokelike basic structure extending radially outward from the displacement rod.

5. The valve of claim 1, wherein the surface contour (254) of the mechanical stop (30, 32, 232) tapers to a point in the direction toward the damping element (20, 220).

6. The valve of claim 1, wherein the means (28, 30, 32, 228, 232) are embodied integrally with the displacement rod (26, 226).

7. The valve of claim 1, wherein the displacement rod (26, 226) is made substantially of plastic.

8. The valve of claim 7, wherein at least one sealing element (20, 220) is pressed directly onto the displacement rod (26, 226).

9. The valve of claim 1, wherein the valve (10, 12) has an electromagnetic actuator (80).

10. The valve claim 1, wherein a second outlet conduit with an associated valve seat and valve member branches off from the valve chamber (18, 218) of the valve (10, 12).

* * * * *